3,166,423
TENDERIZATION OF MEAT
Rhule B. Sleeth, Park Forest, and John F. Campbell, Brookfield, Ill., assignors to Armour and Company, Chicago, Ill., a corporation of Delaware
No Drawing. Filed July 25, 1963, Ser. No. 297,679
5 Claims. (Cl. 99—107)

This invention relates to the tenderization of meat, and more particularly to the post-mortem tenderization of chilled or cold cuts of meat and to freshly-slaughtered carcasses or meat cuts through the use of enzymes.

In the work dealing with the tenderization of meat through the use of enzymes, the outstanding problem is believed to be that of avoiding over-tenderization in parts of the meat being treated. In ante-mortem treatment of animals through the introduction of enzymes just prior to slaughter, it is found that certain portions of the carcass are over-treated and such products are reduced in value. Even in post-mortem treatment where meat cuts are treated with enzymes improperly, it is found that certain portions are satisfactorily tenderized, while other portions are over-tenderized and are rendered unsatisfactory. One indicator of over-treatment is the presence of a slime or film, giving a disagreeable taste, unattractive appearance, and difficulty in handling.

A factor which further complicates the problem is the presence in meat of endogenous or naturally-occurring enzymes, such as cathepsins, etc., which are often catalyzed or rendered active by the added enzymes and add to the modification of the meat.

Another factor involved in the problem is the tendency for some enzymes to remain dormant after the treating operation and to become activated and highly effective at the time of cooking so that over-tenderizing and excess cooking losses can occur at this later stage.

An object of the present invention is to provide a process and means for the uniform tenderization of meat without the disadvantages described above. A further object is to provide for the tenderization treatment of meat without loss of flavor, the creation of undesirable products of over-tenderization, and without substantial cooking losses. A further object is to provide an enzyme-treating process in which the activity of the enzymes is essentially used up during the treating operation so that there is only a limited residual or no enzymes present for further activity at the time of cooking. A still further object is to provide a process for the tenderizing treatment of meat wherein shrinkage is greatly reduced and an excellent flavor is retained in the treated meat cuts. Other specific objects and advantages will appear as the specification proceeds.

We have discovered that over-tenderization and the formation of slime-like conditions can be avoided while obtaining uniform tenderization by utilizing papain and bromelin in a saline solution in which the papain and bromelin are substantially balanced as to activity. Papain is effective in the tenderizing of normal protein, such as muscle, while bromelin is particularly effective in the treatment of collagenous tissues, such as muscle sheaths, tendons, etc. Commercial preparation of papain has about twice the proteolytic activity of bromelin on a unit weight basis. We have found that by balancing the proteolytic activity of the two enzymes in the treating saline solution, a uniform tenderizing of the meat cut is obtained while the cut retains an excellent flavor. Further, no adverse effects are found with respect to the naturally-occurring enzymes in the meat. By providing these enzymes in a warm solution (preferably about 100° F.) and in proportions which will be described hereinafter, the meat cut is uniformly tenderized and the activity of the enzymes is essentially used up in the treating period. This is true whether the cut be a cold or chilled cut or is a cut from a freshly-slaughtered carcass.

In one embodiment of our invention, we inject into a meat cut a saline solution containing about 0.0060 percent to 0.0620 percent of enzymes by weight based on the solution weight, the enzymes consisting of bromelin and papain in balanced relation as to activity and the solution having a temperature of about 100° F. The solution is discharged into the meat at different levels to obtain effective distribution of the enzyme through the meat and may be held for a while and then placed in a freezer for the usual freezing operation.

Any suitable means for injecting the solution into the meat may be employed. We prefer to use hollow needles having spaced openings through the length of the needle so that when the needle is injected into the meat body, the solution will be discharged at spaced points along the length of the needle. For rapid injection, a large number of needles may be used, and these in turn fed from a manifold so that a substantial portion of the meat can be injected at one time. By way of specific example, a manifold may be provided with four rows of stainless steel needles containing three needles per row on two-inch centers, the needles being alternately spaced so that the distance between any two needles is about 1¼ inches. The needles may be 3¾ inches in length with eight apertures spaced one inch apart, the first aperture being ¼ inch from the tip end. It will be understood that any suitable apparatus for the injection of the solution may be employed and the foregoing is set out merely as illustrative of the method.

The sodium chloride content in the solution may vary substantially. We prefer to use from about 8 percent to 12 percent based on the weight of the solution, best results being obtained at about 9 percent. This amount of salt does not interfere with the taste of the product and it is found to be very effective in preventing drip and shrinkage.

Best results have been obtained when the bromelin is present in about one-half the amount by weight of the amount of papain, with the bromelin percentage by weight being from about 0.0040 to about 0.0410, and the papain percentage being about 0.0020 to 0.0210 by weight based on the solution. Best results have been obtained when the percentage of bromelin is 0.0056 to 0.0392 and the percentage of papain is 0.0028 to 0.0196. In each solution, we prefer to have the amount of the bromelin in general about twice that of the papain. Within the limits above suggested, we prefer to make further combinations of the bromelin and papain for the treatment of specific meats which vary in their requirement for tenderization. In other words, we prefer to use a relatively small amount of bromelin and papain in the treatment of meat known as U.S. Good, while a larger amount is used for the treatment of U.S. Standard, and a still larger amount is used for the treatment of U.S. Commercial, while an even larger amount is used for treatment of Utility and Canner-Cutter means including loins, rib eyes, and rounds. Also, the enzyme concentration varies for different cuts within each grade.

The solution, which is preferably warmed to 100° F., is injected into cold cuts which may have a temperature of 35° to 40° F. or in freshly-slaughtered carcasses or cuts having a temperature of around 104° or 105° F.

The pressures will vary depending mainly on the size or weight of the meat body being injected and may vary from 75 to 175 pounds per square inch. For example, for a small cut of beef weighing 10 pounds, the solution would be injected under a pressure of about 75 pounds, while in the treatment of a standard round weighing 100 pounds, the pressure may be as high as 175 pounds or higher.

While the enzyme concentration ranges as described above may be employed with value in the treatment of meat of various types, we prefer for best results to vary the enzyme concentration in the treatment of U.S. Good, Standard, Commercial, and Utility meats. For example, in a salt solution consisting of 9 percent salt and 91 percent water, we would add 0.0056 percent of bromelin and 0.0028 percent of papain for the treatment of U.S. Good. For U.S. Standard, we would add to the same salt solution about 0.0112 percent of bromelin and 0.0056 percent of papain. For U.S. Commercial, we would add to the same solution about 0.0196 percent of bromelin and 0.0098 percent of papain. For Utility meats, such as loins, we would add to the salt solution about 0.0224 percent of bromelin and 0.0112 percent of papain. For Utility rib eyes, we would add to the salt solution about 0.0392 percent of bromelin and 0.0196 percent of papain. The same proportions would be useful also in the treating of Canner-Cutter meats for obtaining the best results.

The solution containing salt, bromelin and papain may be injected in varying amounts into the meat. We prefer to inject about 2 to 3.5 percent of the solution based on the weight of the meat. The preferred amount for injection is about 3 percent.

Specific examples illustrative of the invention may be set out as follows:

Example I

Five pairs of U.S. Good (Armour 32) boneless strip loins, chilled to 40° F., were injected with a solution containing the following:

| | Percent |
|---|---|
| Salt | 9.0 |
| Bromelin | 0.0056 |
| Papain | 0.0028 |
| Water | 91.0 |

(Percentages based on the weight of the solution.)

The right loin of each pair was injected with the solution as above described, and each left loin served as the control. Three percent of the solution based on the weight of the meat was injected into the meat at a pressure of 100 pounds, the solution being at a temperature of about 100° F.

In addition to the above product, four GAQ (Australian) frozen boneless strip loins were cut into half so that the anterior ends of loins 1 and 3 and the posterior ends of loins 2 and 4 were injected with the solution as above described and a solution having twice the amount of bromelin and papain respectively after defrosting. The remaining half of each loin served as the control. After tenderization, these loins were subjected to a panel for evaluating the tenderized steaks, and the following table summarizes the taste panel results which are based on a six-point rating, with six being "extremely tender" and one "extremely tough":

U.S. GOOD STRIP LOINS

| | Tenderness | | Units Improvement | Flavor | | Units Improvement |
|---|---|---|---|---|---|---|
| | Treated | Control | | Treated | Control | |
| Loin 1 | 5.3 | 3.2 | 2.1 | 4.5 | 3.2 | 1.2 |
| Loin 2 | 5.4 | 3.7 | 1.7 | 4.9 | 4.1 | 0.8 |
| Loin 3 | 5.5 | 4.7 | 0.8 | 4.6 | 4.6 | 0.0 |
| Loin 4 | 5.4 | 3.2 | 2.2 | 5.2 | 3.6 | 1.6 |
| Loin 5 | 5.1 | 3.9 | 1.2 | 4.8 | 4.0 | 0.8 |
| Average | 5.3 | 3.7 | 1.6 | 4.8 | 3.9 | 0.9 |

GAQ BONELESS STRIP LOINS

| Loin 1 | 5.1 | 3.0 | 2.1 | 5.0 | 4.2 | 0.8 |
| Loin 2 | 3.6 | 1.4 | 2.2 | 4.0 | 2.8 | 1.2 |
| Loin 3 | 4.9 | 1.9 | 3.0 | 4.4 | 2.4 | 2.0 |
| Loin 4 | 4.7 | 1.9 | 2.8 | 4.9 | 3.2 | 1.7 |
| Average | 4.6 | 2.1 | 2.5 | 4.6 | 3.2 | 1.4 |

The above data indicates that enzyme-treated U.S. Good strip loins were all significantly improved with respect to tenderness. Not only was the acceptability enhanced to a tenderness equivalent to that associated with at least top Choice or higher, but equally important, is the evenness and uniformity of tenderization between different animals within the same grade without any over-tenderization. Flavor was improved in all samples with the exception of one where there wasn't any difference between the treated and control.

Tenderness and flavor of the four frozen enzyme-tenderized GAQ strip loins were significantly improved when compared to the corresponding controls. A greater degree of improvement in tenderness was noted in loins 3 and 4 which was due to the higher enzyme concentration.

Example II

A boneless loin chilled to 35° F. and weighing 10 pounds was injected with three-tenths of a pound of solution, the solution containing about 9 percent salt and 91 percent water, and about 0.0224 percent bromelin and 0.0112 percent papain. The injection was by means of hollow needles carried by a manifold. The needles were 3 5/16 inches long with 10 apertures per needle, the apertures being spaced over 1 3/4 inches of the needle from the tip end. The first six openings were spaced 1/4 inch, with the remaining four spaced at 1/2-inch intervals in a rotating manner around the needle. Several injections were made to encompass the entire loin. After the injection, the loin was held for about an huor and then put in a freezer. The meat was frozen solid, and at a later date cut into steaks. The solution at the time of injection had a temperature of 100° F., and the solution was injected under pressure of 100 p.s.i.

The product treated as above described was significantly improved with respect to tenderness. There was no over-tenderization, and no film or slime or other products indicating over-tenderization. In addition to the uniformity of tenderization throughout the product, there was also an improvement in flavor.

Example III

The process was carried out as described in Example II except that the product treated was a round-weighing 80 pounds, the pressure of injection being 150 pounds and the temperature of the solution being about 100° F. The results obtained were comparable to those obtained in Example II.

Example IV

A 15-pound boneless loin was treated as described in Example II, using a pressure of 75 pounds and a solution temperature of 100° F. Results comparable to those described in Example II were obtained.

Example V

A U.S. Commercial beef cut weighing 10 pounds was injected with a solution having the following composition:

| | Percent |
|---|---|
| Salt | 9.0 |
| Bromelin | 0.0196 |
| Papain | 0.0098 |
| Water | 91.0 |

(Percentages based on the weight of the solution.)

The solution at a temperature of 100° F. and at a pressure of 100 pounds was injected into the meat, using a manifold equipped with 4 rows of stainless steel needles containing 3 needles per row. The needles were on 2-inch centers and were 3 3/4 inches in length with 8 apertures in each needle spaced 1 inch apart. The meat was injected with three-tenths of a pound of the solution, and after injection was frozen. Later the frozen piece was cut into steaks and evaluated. Results comparable to those described in Example I were obtained.

Example VI

A beef carcass immediately after slaughter and having a temperature of 104° F. was injected as described in Example I with an enzyme-salt solution having a temperature of 100° F. The portion of the carcass treated was graded as U.S. Good, and the solution had a composition as follows:

| | Percent |
|---|---|
| Salt | 9.0 |
| Bromelin | 0.0056 |
| Papain | 0.0028 |
| Water | 91.0 |

(Percentages based on the weight of the solution.)

After injection, the carcass was chilled and treated in the usual manner. Uniform and even tenderization of the treated portion was effected.

Example VII

A Utility loin weighing 60 pounds from a freshly-slaughtered carcass, and having a temperature of 105° F., was injected with 1.8 pounds of solution in which the salt and water proportions remained as described in Example II, but the bromelin percentage was 0.0392 and the papain percentage was 0.0196. After injection through the use of hollow needles as described in Example II, the loin was placed in a chill room for 24 hours and was then ready to go to a consumer. The product had the uniform tenderization and flavor qualities described in Example I.

Example VIII

A 100-pound round (U.S. Standard) from a freshly-slaughtered carcass was injected with 3 pounds of solution in the following composition:

| | Percent |
|---|---|
| Salt | 9.0 |
| Bromelin | 0.0112 |
| Papain | 0.0056 |
| Water | 91.0 |

(Percentages based on the weight of the solution.)

The solution had a temperature of 100° F. and was injected under a pressure of 175 p.s.i. The injection was through hollow needles which were repeatedly used to encompass the entire round. After injection, the meat was chilled for 48 hours and then frozen. On panel evaluation as described in Example I, it was found that the product was evenly and uniformly tenderized and flavor was improved. There was no evidence of over-tenderization or of the by-products of over-tenderization. The product was juicy, tender, and there was very little cooking loss. The shear (lb.) was substantially reduced below that of an untreated control of equal weight and from the same animal. The cooking loss as compared with the control was reduced by 3 percent.

While in the foregoing specification we have set forth specific steps and compositions in considerable detail for the purpose of illustrating embodiments of our invention, it will be understood that such detail or details may be varied widely by those skilled in the art without departing from the spirit of our invention.

We claim:

1. In a post-mortem process for tenderizing meat consisting largely of muscle and connective tissue, the steps of forming a saline water solution of bromelin and papain, in which the bromelin is from 0.0040 to 0.0410 percent by weight of the solution and the papain is from 0.0020 to 0.0210 percent and the sodium chloride is from 8 to 12 percent, warming the solution to about 100° F., and injecting the solution into the meat under a pressure of about 75 to 175 pounds per square inch and in the proportion of about 2 to 3.5 percent of the solution based on the weight of the meat.

2. The process of claim 1 in which about 3 percent of the solution is injected into the meat.

3. The process of claim 1 in which the solution contains about 9 percent of sodium chloride.

4. In a post-mortem process for treating meat, the steps of forming a saline water solution of bromelin and papain, in which the bromelin is about 0.0056 to about 0.0392 percent and the papain is from about 0.0028 to about 0.0196 percent, and the sodium chloride is from 8 to 12 percent by weight of the solution, warming the solution to about 100° F., and injecting about 3 percent of said solution, based on the weight of the meat, into said meat under a pressure of about 75 to about 175 pounds per square inch.

5. In a post-mortem process for tenderizing beef of U.S. Good grade, the steps of forming a solution consisting substantially of 9 percent salt, 0.0056 percent bromelin, 0.0028 percent papain, and about 91 percent water, based on the weight of the solution, warming the solution to about 100° F., and injecting into said meat about 3 percent of the solution based on the weight of the meat under a pressure of from about 75 to about 175 pounds per square inch.

References Cited in the file of this patent

UNITED STATES PATENTS

| 2,140,781 | Allen | Dec. 20, 1938 |
| 2,688,555 | Komarik et al. | Sept. 7, 1954 |
| 2,903,362 | Beuk et al. | Sept. 8, 1959 |
| 2,963,376 | Hogan | Dec. 6, 1960 |
| 2,999,020 | Williams | Sept. 5, 1961 |